US012613090B2

(12) United States Patent
Joo et al.

(10) Patent No.: US 12,613,090 B2
(45) Date of Patent: Apr. 28, 2026

(54) APPARATUS OF VISION CHROMATIC CONFOCAL SENSOR BASED ON A GEOMETRICAL PHASE LENS

(71) Applicants: Industry-Academic Cooperation Foundation, Chosun University, Gwangju (KR); neXensor Inc., Daejeon (KR)

(72) Inventors: Ki Nam Joo, Gwangju (KR); Hyo Mi Park, Gwangju (KR); Ui Hyeok Kwon, Gwangju (KR); Joon Ho You, Daejeon (KR)

(73) Assignees: Industry-Academic Cooperation Foundation, Chosun University, Gwangju (KR); neXensor Inc., Daejeon (KR)

( * ) Notice: Subject to any disclaimer, the term of this patent is extended or adjusted under 35 U.S.C. 154(b) by 39 days.

(21) Appl. No.: 18/485,890

(22) Filed: Oct. 12, 2023

(65) Prior Publication Data

US 2024/0093982 A1     Mar. 21, 2024

Related U.S. Application Data

(63) Continuation of application No. PCT/KR2022/095066, filed on Mar. 29, 2022.

(30) Foreign Application Priority Data

Apr. 13, 2021     (KR) ........................ 10-2021-0047833

(51) Int. Cl.
*G01B 11/02* (2006.01)
(52) U.S. Cl.
CPC ................................... *G01B 11/02* (2013.01)

(58) Field of Classification Search
CPC ..... G01B 11/02; G01B 11/022; G01B 11/026; G01B 11/0625; G01B 11/24; G01B 2210/50; G02B 21/00; G02B 21/0032; G02B 3/00; G02B 3/0043; G02B 5/30; G02B 5/30831; G02B 5/3083
USPC ......................................................... 356/364
See application file for complete search history.

(56) References Cited

U.S. PATENT DOCUMENTS

| | | | |
|---|---|---|---|
| 2015/0054937 A1 | 2/2015 | Lippert et al. | |
| 2015/0090908 A1 | 4/2015 | Lippert et al. | |
| 2021/0069848 A1* | 3/2021 | Nomaru | B23Q 3/06 |

FOREIGN PATENT DOCUMENTS

| | | | | |
|---|---|---|---|---|
| CN | 108474646 A | * | 8/2018 | ............. G01B 11/00 |
| JP | 2006-133499 A | | 5/2006 | |
| KR | 10-2021-0024675 A | | 3/2021 | |

OTHER PUBLICATIONS

Hyo Mi Park et al.; "Vision chromatic confocal sensor based on a geometrical phase lens"; Applied Optics; vol. 60, No. 10; Mar. 26, 2021; pp. 2898-2901.
International Search Report issued in PCT/KR2022/095066; mailed Jun. 30, 2022.

* cited by examiner

*Primary Examiner* — Tri T Ton
(74) *Attorney, Agent, or Firm* — Studebaker Brackett PLLC

(57)     ABSTRACT

The present invention relates to a chromatic confocal sensor based on a geometrical phase lens, and provides a chromatic confocal sensor that can confirm a height of a specimen and a location of a height measurement point through a configuration of a simple device.

8 Claims, 7 Drawing Sheets

APPARATUS OF VISION CHROMATIC CONFOCAL SENSOR BASED ON A GEOMETRICAL PHASE LENS

CROSS-REFERENCE TO RELATED APPLICATIONS

The present application is a continuation of International Patent Application No. PCT/KR2022/095066, filed on Mar. 29, 2022, which is based upon and claims the benefit of priority to Korean Patent Application No. 10-2021-0047833, filed on Apr. 13, 2021. The disclosures of the above-listed applications are hereby incorporated by reference herein in their entirety.

BACKGROUND OF THE INVENTION

Field of the Invention

The present invention relates to a vision chromatic confocal sensor, and more particularly, to an apparatus that can implement a vision chromatic confocal sensor by a simpler optical configuration and at the same time, continuously monitor measurement points.

Description of the Related Art

Recently, the importance of shape measurement and internal thin film thickness measurement is increasing to ensure product quality and stability in the semiconductor, display, and secondary battery fields. Among these, confocal sensors are widely used in an industrial field due to their relatively simple structure and high precision.

Existing confocal sensors include a confocal scanning sensor and a chromatic confocal sensor, and among these, the chromatic confocal sensor has an advantage of being capable of measuring a height of a specimen without a driving unit by using a chromatic aberration of an optical system.

The confocal sensors have limitations in real-time measurement because they require a mechanical actuator using a scanning method. To overcome this, a chromatic confocal sensor is developed, and the chromatic confocal sensor measures the height of the specimen using the chromatic aberration of the optical system. When the chromatic aberration occurs in the optical system, a wavelength of focused light changes depending on the height of the specimen, and by detecting the wavelength of the light, the height of the specimen can be measured.

However, this chromatic confocal sensor has two following limitations. 1) The chromatic confocal sensor requires a relatively complex optical system design to cause the chromatic aberration in the optical system, and also has a disadvantage that it is difficult to confirm the location of the measurement point due to the principle of a point measurement method.

The chromatic confocal sensor must generate sufficient chromatic aberration in the optical system depending on a utilization purpose, but it is not sufficient to induce such chromatic aberration through existing lenses. To overcome this, existing sensors generate the chromatic aberration through a combination of multiple lenses, but in this case, there is a disadvantage in that a measurement probe becomes complicated.

On the other hand, point measurement type chromatic confocal sensors have limitations in application because they cannot confirm the location of the measurement point due to the measurement principle. Even if the height of the measurement point is detected, if the location of the measurement point cannot be confirmed, a user will have difficulty measuring in the field and at the same time, there is a problem that it is difficult to interpret measurement results.

PRIOR ART DOCUMENT

Patent Document

Korean Patent Gazette NO. 10-2021-0024675

SUMMARY OF THE INVENTION

The present invention is contrived to solve the problem, and provides a vision chromatic confocal sensor that can confirm a height of a specimen and a location of a height measurement point through a configuration of a simple device.

The objects of the present invention are not limited to the aforementioned objects, and other objects, which are not mentioned above, will be apparent from the following description.

In order to achieve the objects, and an apparatus of a vision chromatic confocal sensor according an exemplary embodiment of the present invention includes: a light source unit generating light; an optical circulator receiving the light from the light source unit; a light conversion unit including a geometrical phase lens, and modulating the light received from the optical circulator and emitting light in which chromatic aberration is expressed to a specimen, and receiving light reflected from the specimen; a stage at which the specimen to which the light emitted from the light conversion unit is irradiated is located; a beam splitter splitting the reflected light reflected by the specimen; a measurement unit detects the reflected light transmitted through the beam splitter and received by the light conversion unit; and a monitoring unit detecting the reflected light reflected by the beam splitter.

The light generated by the light source unit may be a white light source.

The measurement unit may include a collimating lens modulating the light received from the optical circulator into parallel light, a geometrical phase lens disposed at a rear stage from the collimating lens along a progress path of the light, and a first phase retardation plate disposed behind the geometrical phase lens along the progress path of the light.

The geometrical phase lens may be a metalens, and the geometrical phase lens may polarize the light to separate light collected on a focus of the specimen and diverged light.

The first phase retardation plate may be a ¼ wavelength retardation plate.

The measurement unit may be linked to the optical circulator.

The monitoring unit may include a second phase retardation plate accommodating the reflected light reflected by the beam splitter, a linear polarizer disposed behind the second phase retardation plate along the progress path of the reflected light, and an imaging lens disposed behind the linear polarizer along the progress path of the reflected light.

The monitoring unit may further include a camera detecting the reflected light transmitted through the imaging lens.

Specific details for achieving the above objects will become clear with reference to embodiments to be described later in detail in conjunction with the accompanying drawings.

However, the present invention is not limited to an exemplary embodiment disclosed below but may be implemented in various different shapes and the present embodiment just completes a disclosure of the present invention and is provided to completely inform a scope of the present invention to those skilled in the art to which the present invention belongs (hereinafter, referred to as "those skilled in the art").

According to a n exemplary embodiment of the present invention, the principle of a chromatic confocal sensor can be implemented through a simple optical configuration, and at the same time, there is an effect of continuously monitoring the measurement point.

Further, it is possible to measure the height of the specimen to be measured and at the same time, confirm the location where the specimen is measured.

The effects of the present invention are limited to the above-described effects, and the potential effects expected by the technical features of the present invention will be clearly understood from the description below.

DETAILED DESCRIPTION OF THE PREFERRED EMBODIMENT

Figure 1:
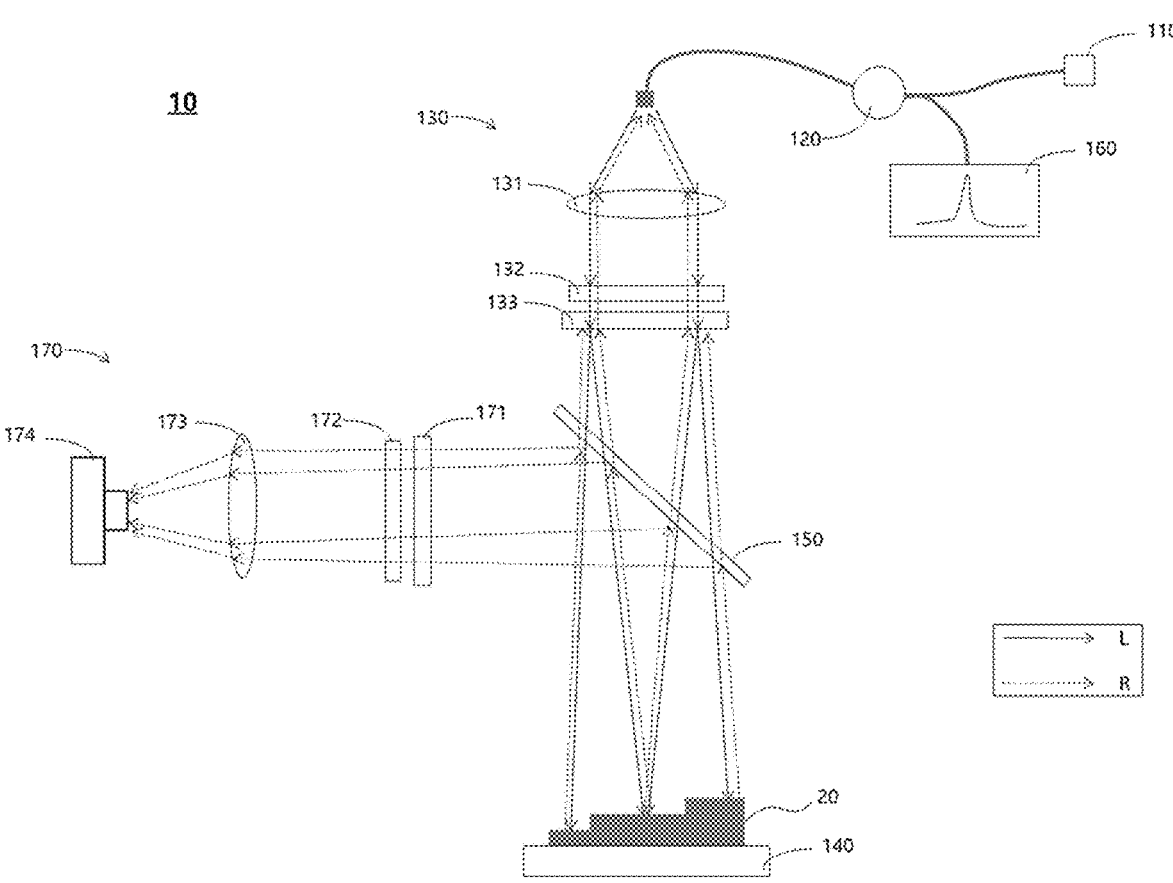
FIG. 1 illustrates a configuration of a chromatic confocal sensor according to an exemplary embodiment of the present invention.

The present invention may have various modifications and various exemplary embodiments and specific exemplary embodiments will be illustrated in the drawings and described in detail.

Various features of the invention disclosed in the claims may be better understood in consideration of the drawings and detailed description. Devices, methods, manufacturing methods, and various embodiments disclosed in the specification are provided for illustrative purposes. The disclosed structural and functional features are intended to enable a person skilled in the art to specifically implement various embodiments, and are not intended to limit the scope of the invention. The disclosed terms and phrases are intended to provide an easy-to-understand description of the various features of the disclosed invention, and are not intended to limit the scope of the invention.

In describing the present invention, a detailed description of related known technologies will be omitted if it is determined that they unnecessarily make the gist of the present invention unclear.

FIG. 1 illustrates a configuration of a chromatic confocal sensor according to an exemplary embodiment of the present invention, and hereinafter, the chromatic confocal sensor according to an exemplary embodiment of the present invention will be described with reference to FIG. 1.

The chromatic confocal sensor 10 according to an exemplary embodiment of the present invention include a light source unit 110 generating incident light L; an optical circulator 120 receiving the incident light L from the light source unit 110; an light conversion unit 130 having a geometrical phase lens 132, and modulating the incident light L received from the optical circulator 120 and incident light L in which chromatic aberration is expressed to a specimen 20, and receiving reflected light R reflected from the specimen 20; a stage 140 at which the specimen 20 to which the incident light L emitted from the light conversion unit 130 is irradiated is located; a beam splitter 150 splitting the reflected light R reflected by the specimen 20; a measurement unit 160 detecting the reflected light R transmitted through the beam splitter 150 and received by the light conversion unit 130; and a monitoring unit 170 detecting the reflected light R reflected by the beam splitter 150.

The light source unit 110 is a device that generates light with a broad wavelength band as the incident light L and emits the generated light, and the incident light L generated or emitted through the light source unit 110 may be a white light source.

The optical circulator 120 may be composed of an optical fiber and is disposed between the light source unit 110 and the light conversion unit 130, and the incident light L generated by the light source unit 110 may be transmitted to the optical circulator 120, and the optical circulator 120 may transmit the incident light L to the light conversion unit 130 through the optical fiber, and more specifically, may transmit the incident light L to a collimating lens L of the light conversion unit 120 to be described below. The optical circulator 120 may be connected to a detection unit 160, which will be described later, and transmits the reflected light R reflected on the specimen 20 and returned to the detection unit 160.

The light conversion unit 130 modulates the incident light L received from the optical circulator 120 to express the chromatic aberration, and emits the incident light L in which the chromatic aberration is expressed toward the specimen 20, and the incident light L in which the chromatic aberration is expressed may be irradiated to the specimen 20. Further, the light conversion unit 130 may receive the reflected light R in which the incident light L with the chromatic aberration reaching the specimen 20 is reflected on the specimen 20 and returned.

The light conversion unit 130 may include a collimating lens 131; the geometrical phase lens 132 disposed behind the collimating lens 131; and a first phase retardation plate 133 disposed behind the geometrical phase lens 132 along a path of the incident light L transmitted from the optical circulator 120, and more specifically, may include the collimating lens 131 which the incident light L transmitted from the optical circulator 120 preferentially reaches; the geometrical phase lens 132 which incident light (parallel light) R passing through the collimating lens 131; and the first phase retardation plate 133 which the incident light L passing through the geometrical phase lens 132 reaches.

In addition, the light conversion unit 130 passes the reflected light R reflected on the specimen 20 and returned through the first phase retardation plate 133, the geometrical phase lens 132, and the collimating lens 131 in order, and the collimating lens 131 transmits the reflected light R to the optical circulator 120.

The collimating lens 131 may be connected to the optical circulator 120 by the optical fiber, and receives the incident light L generated by the light source unit 110 from the optical circulator 120 by the optical fiber. At the same time, the collimating lens 131 transmits the reflected light R reflected on the specimen 20 and returned to the optical circulator 120 by the optical fiber.

The collimation lens 131 converts the incident light L received by the optical circulator 120 into parallel light while passing the incident light L, and transmits the parallel light to the geometrical phase lens 132.

The geometrical phase lens 132 polarizes the parallel light transmitted from the collimating lens 131 and separates the parallel light into two incident lights R.

When the light (incident light or reflected light) passing through the geometrical phase lens 132 has liner polarization, each light is divided into two lights, and in this case, respective lights have right-hand circular polarization (RHP) and left-hand circular polarization (LHP), respectively. This is the same even when each light has randomly polarization.

In the geometrical phase lens 132, light of the right-hand circular polarization (RHP) is switched to light of the left-hand circular polarization (LHP) to form collective light collected with respect to the specimen 20, and the light of the left-hand circular polarization (LHP) is switched to the light of the right-hand circular polarization (RHP) to form divergent light diverged with respect to the specimen 20.

Figure 2:
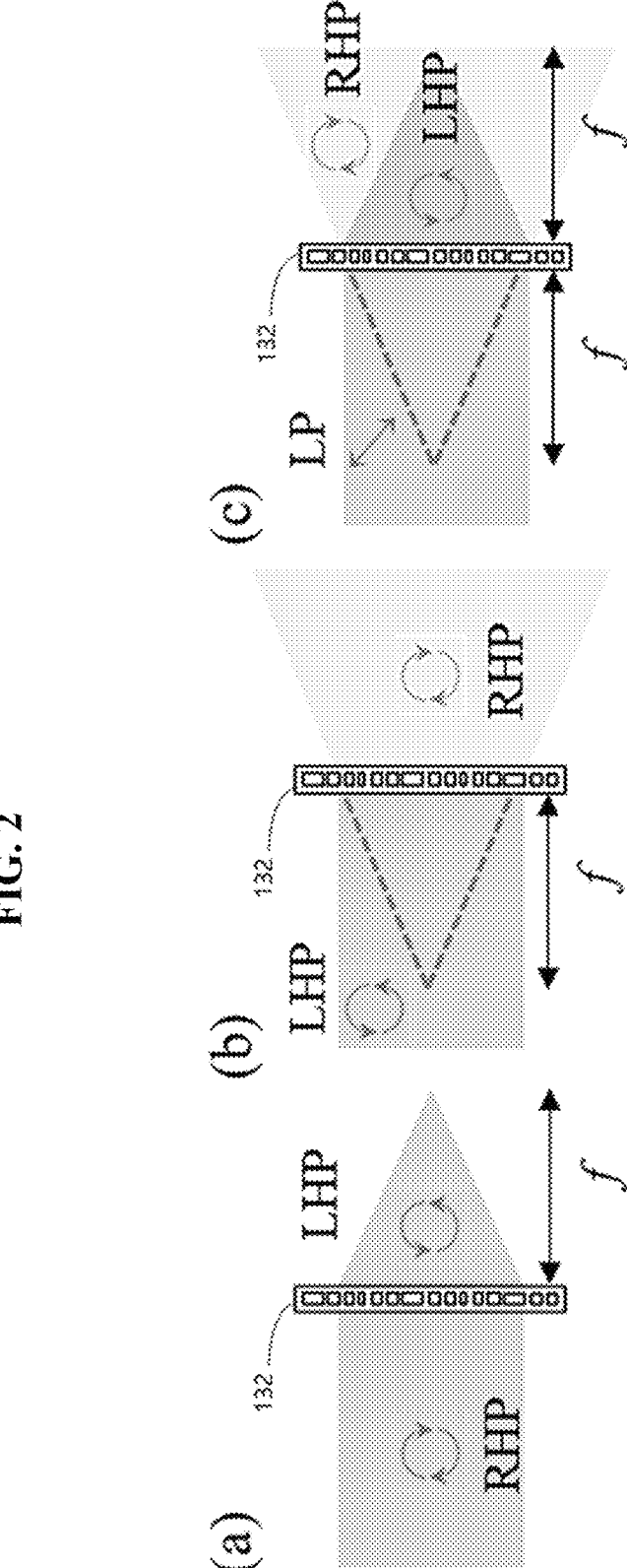
FIG. 2 is a diagram to describe polarization of a geometrical phase lens of a chromatic confocal sensor according to an exemplary embodiment of the present invention.

As an example, referring to FIG. 2A, when the light passed toward the geometrical phase lens 132 is the right-hand circular polarization (RHP), the right-hand circular polarization (RHP) is modulated into the left-hand circular polarization (LHP) by passing through the geometrical phase lens 132, and forms the collected collective light.

As an example, referring to FIG. 2B, when the light passed toward the geometrical phase lens 132 is the left-hand circular polarization (LHP), the left-hand circular polarization (LHP) is modulated into the right-hand circular polarization (RHP) by passing through the geometrical phase lens 132, and forms the diverged divergent light.

As an example, referring to FIG. 2C, when the light passed toward the geometrical phase lens 132 is the linear polarization (LP), the linear polarization is modulated into the right-hand circular polarization (RHP) and the left-hand circular polarization (LHP) by passing through the geometrical phase lens 132, and switched to the collected collective light and the diverged divergent light.

The geometrical phase lens 132 as one of metalenses may be designed and manufactured to create a meta surface by using nanometer-level pillars on one thin substrate, and perform a lens effect and a function such as aberration correction, dispersion correction, etc., by using the meta surface, and the geometrical phase lens 132 may gradually increase the phase to cover an entire range 0 to $2\pi$ of the phase as a material, geometry, orientation, and spatial distribution of the geometrical phase lens 132 forming the meta surface are adjusted.

Figure 3:
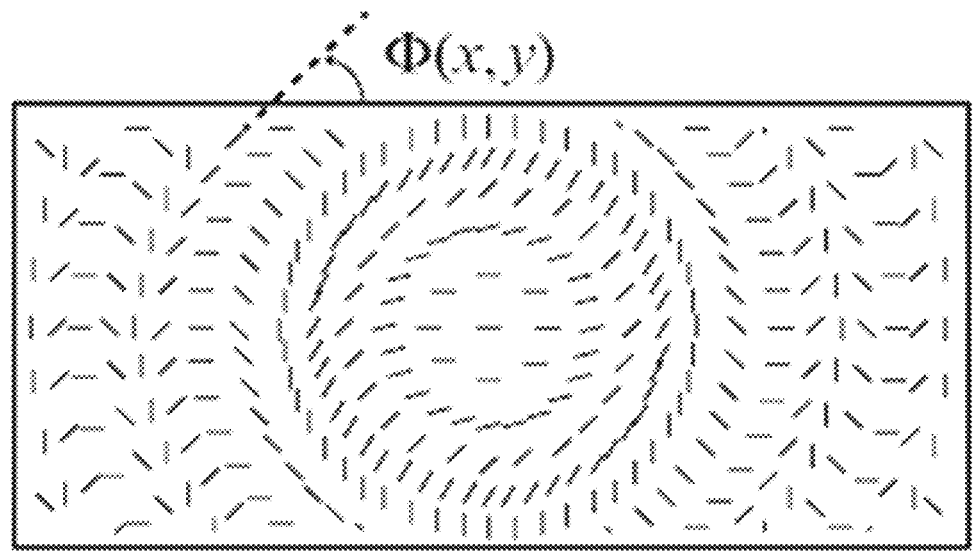
FIG. 3 is a plan view of the geometrical phase lens of the chromatic confocal sensor according to an exemplary embodiment of the present invention.

In particular, in the geometrical phase lens 132, an array of internal liquid crystals may be formed in a structure such as a zone plate as in FIG. 3, and the geometrical phase lens

132 may have a characteristic in that respective wavelengths of the passed light are refracted in different directions according to a wavelength of the light passing through the geometrical phase lens 132 and an interval of a pattern and a focal location according to each wavelength is changed. By using this, the geometrical phase lens 132 can configure a chromatic confocal microscope, and in this case, a wavelength shift $\Delta\lambda$ of light and a change $\Delta f$ of a focus have a relationship shown in Equation (1) below.

$$\Delta f/f = -\Delta\lambda/\lambda \qquad\qquad \text{Equation (1):}$$

By the meta surface of the geometrical phase lens 132, respective wavelengths of the incident light R passing through the geometrical phase lens 132 are refracted in different directions, so in the incident light R, chromatic aberrations having different focal locations may be expressed. Due to the expression of the chromatic aberration, each wavelength of the reflected light R returned on the specimen 20 and returned is analyzed to measure or determine the height of the specimen 20 in the measurement unit 160.

The first phase retardation plate 133 may be a quarter-wave retardation plate (QWP), and may convert circular polarization (right-circular polarization to left-circular polarization) of the transmitting light (incident light or reflected light) into linear polarization, or convert the linear polarization of the transmitted light (incident light or reflected light) into the circular polarization.

The first phase retardation plate 133 transmits two incident lights (right-hand circular polarization and left-hand circular polarization divided by the geometrical phase lens, and the first phase retardation plate 133 receives two incident lights L polarized by the right-hand circular polarization and the left-hand circular polarization, and converts the received right-hand circular polarization and left-hand circular polarization into the linear polarization, and then emits the incident L to the specimen 20. In this case, the incident light L emitted to the specimen 20 is constituted by a collected light (collective light) forming the focus on the specimen 20 and a light (divergent light) diverged to the specimen 20.

Further, the first phase retardation plate 133 may preferentially receive the reflected light R reflected and returned from the specimen 20, and transmit the received reflected light R to the geometrical phase lens 132, and the first phase retardation plate 133 may convert the reflected light R having the linear polarization into the circular polarization (right-hand circular polarization or left-hand circular polarization).

Figure 4:
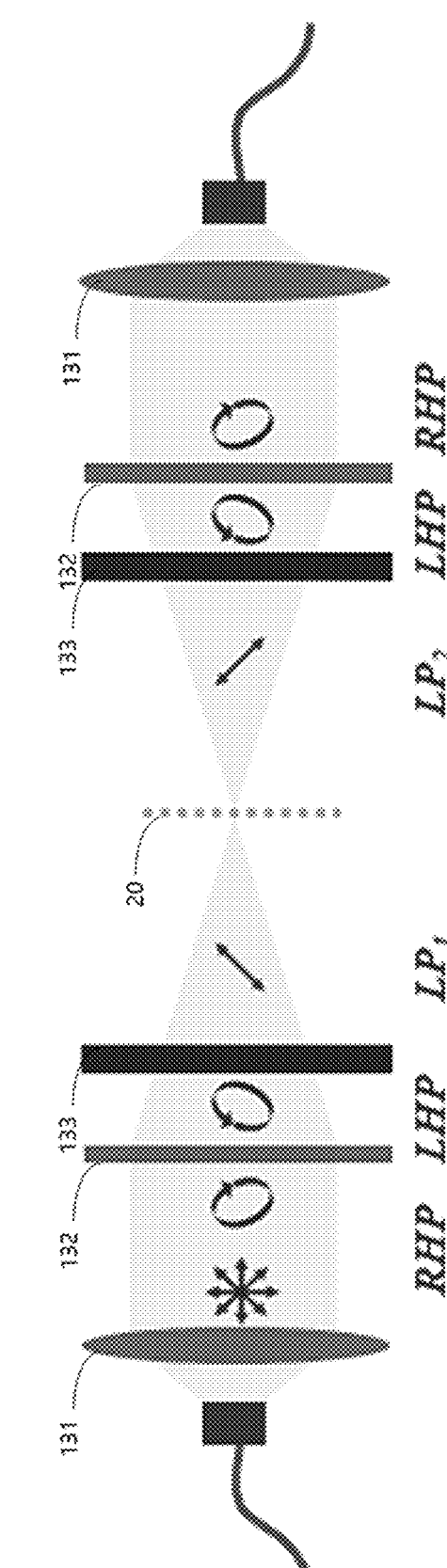
FIG. 4 illustrates an operation example of the chromatic confocal sensor according to an exemplary embodiment of the present invention.

As an implement example, referring to FIG. 4, the right-hand circular polarization RHP among the incident lights L as the parallel light by the collimating lens 121 is converted into the left-hand circular polarization LHP collected through the geometrical phase lens 132, and then the left-hand circular polarization LHP reaches the specimen 20 while forming the focus in the specimen 20 in the form of a light LP1 converted into the linear polarization LP and collected, and then reflected on the specimen 20 and returned as the reflected light R, and the reflected light R as linear polarization LP2 is transmitted into the first phase retardation plate 133 and converted into the left-hand circular polarization LHP, and then converted into the right-hand circular polarization RHP by the geometrical phase lens 122 and incident on the collimating lens 131 in the form of the parallel light.

The specimen 20 has a predetermined area, and a surface of the specimen 20 may have various height differences (steps). The incident light L emitted from the light conversion unit 130 may form the focus.

The stage 140 may be configured to fix and maintain the specimen 20. The stage 140 may be disposed at a location which the light L irradiated from the light conversion unit 110 may reach, and may provide a predetermined area in which the specimen 20 may be provided, and have a flat surface.

The beam splitter 150 may be disposed on a path of the light between the light conversion unit 130 and the specimen 20. The optical splitter 150 transmits a part of the reflected light R in which the light L reaching the specimen 20 is reflected and returned and allows the corresponding part of the reflected light to reach the light conversion unit 130, and reflects the other part of the reflected light R and allows the corresponding part of the reflected light to reach the monitoring unit 170.

The reflected light R transmitted by the beam splitter 150 is incident on the light conversion unit 130, and more specifically, the reflected light R reaches the first phase retardation plate 133, and then passes through the geometrical phase lens 132 and the collimating lens 131, and is incident on the optical circulator 120.

In this case, two reflected lights R reflected on the specimen 20 are a light collected and a light diverged with respect to the specimen, and are reflected on the specimen 20, passes through the first phase retardation plate 133 and the geometrical phase lens 132, and is incident on the collimating lens 131 in the form of the parallel light. Thereafter, the light collected by passing through the collimating lens 131 reaches the optical circulator 120 through the optical fiber, and reaches the measurement unit 160 connected to the optical circulator to measure the height of the specimen 20 through a wavelength detected by the measurement unit 160.

The measurement unit 160 may be a spectrometer, and detects the reflected light R through the optical circulator 120, and analyzes a spectrum of the reflected light R, and more specifically, the measurement unit 160 may observe the wavelength of the reflected light R according to the height of the specimen 20, and analyzes the observed wavelength to measure the height of the specimen 20.

Figure 5:
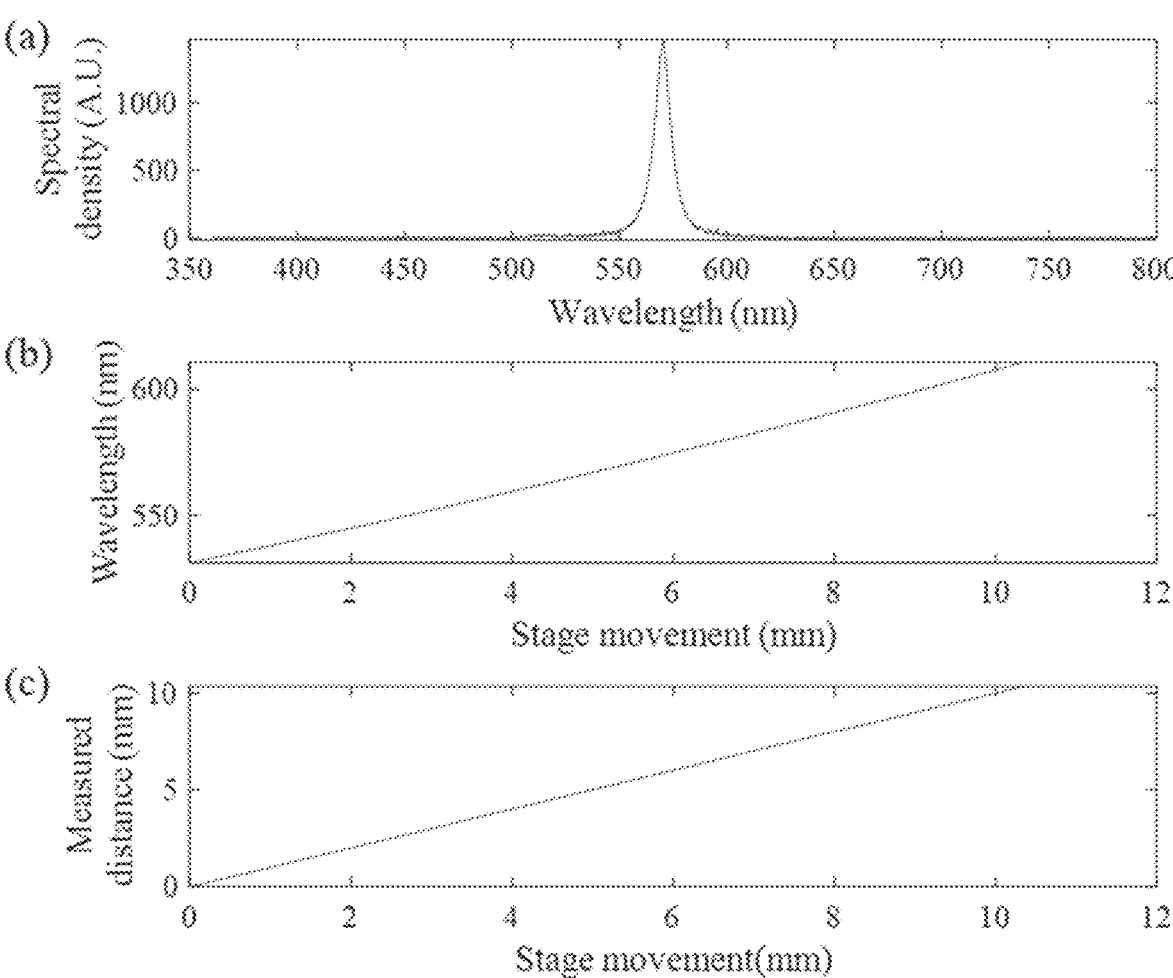
FIG. 5 illustrates a specimen height measurement example of a measurement unit of the chromatic confocal sensor according to an exemplary embodiment of the present invention.

More specifically, referring to FIG. 5, the intensity for each wavelength band of the reflected light according to the height of the specimen detected at an arbitrary location (measurement point) of the specimen is observed as in FIG. 5A, and FIG. 5B illustrates a change of the wavelength as a location where the reflected light is detected moves in a height direction of the specimen, and in FIG. 5C, it is possible to mathematically model the change of the wavelength changed with movement in the height direction of the specimen by using Equation (1) and FIG. 5B above, and a measurement result acquired by the modeling is illustrated.

The monitoring unit 170 includes a second phase retardation plate 171 receiving the reflected light reflected by the beam splitter 150, a linear polarizer 172 which the light passing through the second phase retardation plate 171 reaches, and an imaging lens 173 which the light passing through the linear polarizer 172 reaches. The monitoring unit 170 may further include a camera 174 detecting the light passing through the imaging lens 173.

The second phase retardation plate 171, the linear polarizer 172, and the imaging lens 173 may be sequentially disposed on the path of the light, and the reflected light R reflected by the beam splitter 150.

Figure 6:
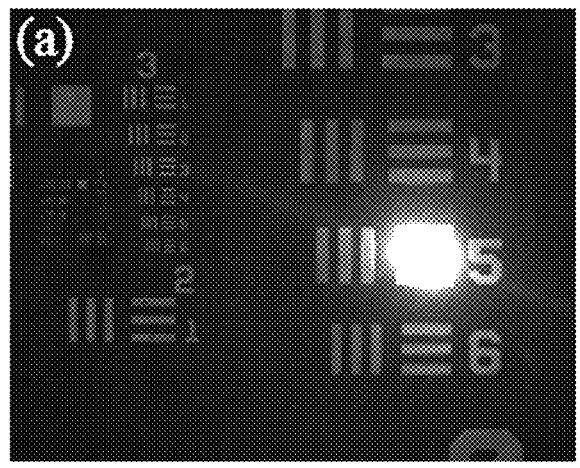
FIG. 6 illustrates a measurement example of a measurement point according to a monitoring unit of the chromatic confocal sensor according to an exemplary embodiment of the present invention.
Figure 6:
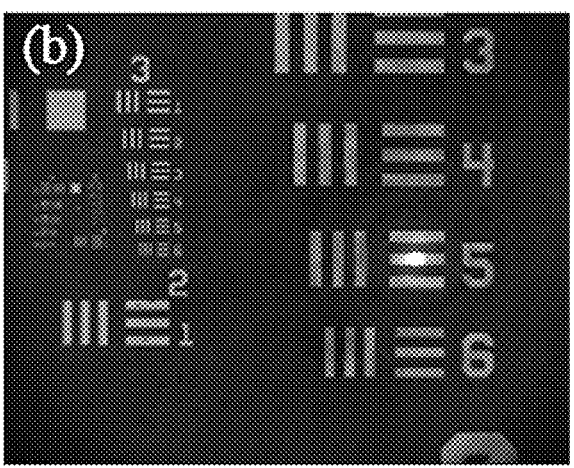

Referring to FIG. 6A, since the light forming the focus of the specimen 20 generally has a very high light intensity, a saturation phenomenon occurs at the time of detecting the light through the camera 174, and an accurate measurement location may be confirmed due to the saturation phenomenon.

Therefore, the monitoring unit 170 includes the second phase retardation plate 171, so in the second phase retardation plate 171, the lights reflected from the specimen 20 is linearly polarized and converted vertically to each other, and in this case, a light amount may be controlled through the linear polarizer 172. As a result, referring to FIG. 6B, the saturation phenomenon does not occur when the light is detected by the camera 174, and a relatively clear image may be obtained, and at the same time, the measurement location may be confirmed.

The second phase retardation plate 171 may be a quarter-wave retardation plate (QWP), and may convert circular polarization (right-circular polarization to left-circular polarization) of the incident light into linear polarization, or convert the linear polarization of the incident light into the circular polarization.

The reflected light R received by the second phase retardation plate 171 includes both the collected light and the diverged light.

The linear polarizer 172 controls the light amount of the reflected light R received from the second phase retardation plate 171, and is disposed between the second phase retardation plate 171 and the imaging lens 173.

The imaging lens 173 is disposed on the path of the reflected light R, and may condense the reflected light R received from the linear polarizer 172 onto the camera 174.

The camera 174 may be a Charge-Couple Device (CCD) camera or a Complementary Metal Oxide Semiconductor (CMOS) camera, and may be preferably the CMOS camera.

The camera 174 may implement a point (measurement point) at which the height of the specimen 20 in the measuring unit 160 is measured from the reached reflected light R through an image. In the camera 174, the reflected light R of the incident light L focused on the specimen 20 and the reflected light R of the incident light L widely irradiated on the specimen 20 are detected simultaneously, so the camera 174 may implement the point (measurement point) at which the height of the specimen 20 is measured as the image, and it is possible to confirm the measurement point through the image, and even when the measurement point of the specimen 20 in the measuring unit 160 is changed, continuous monitoring is possible.

As an implement example, referring to FIG. 1, in an operation example of the chromatic confocal sensor 10 according to an exemplary embodiment of the present invention, the light L generated by the light source unit 110 is transmitted to the optical circulator 120 and the light L is transmitted to the collimating lens 131 by the optical circulator 120. The light transmitted to the collimating lens 131 is modulated into parallel light, and the modulated parallel light reaches the geometric phase lens 132 and is divided into right-hand circular polarization and left-hand circular polarization, and the right-hand circular polarization and the left-hand circular polarization pass through the first phase retardation plate (¼ wavelength retardation plate) 133. Thereafter, the light reaches the specimen 20 provided on the stage 140 by penetrating the beam splitter 150. A part (left-hand circular polarization) of the lights (right-hand circular polarization and left-hand circular polarization) is the collected light forming the focus in the specimen 20 and the other part (right-hand circular polarization) is the diverged light not forming the focus in the specimen 20. The light L reaching the specimen 20 is reflected and returned to the beam splitter 150 as the reflected light R, and the optical splitter transmits a partial reflected light R to the light conversion unit 130 and the other partial reflected light R to the monitoring unit 170.

The reflected light R reaching the light conversion unit 130 sequentially passes through the first phase retardation plate 133 and the geometrical phase lens 132, and the light (right-hand circular polarization) diverged with respect to the specimen 20 is further diverged while passing through the first phase retardation plate 133 and the geometrical phase lens 132, so the corresponding light does not reach the collimating lens 131 or the optical circulator 120, and the light (left-hand circular polarization) collected with respect to the specimen 20 is modulated into the right-hand circular polarization while passing through the first phase retardation plate 133 and the geometrical phase lens 132 and at the same time, passes through the collimating lens 131 while being modulated into the parallel light and the reflected light R is incident on the optical circulator 120. The reflected light R incident on the optical circulator 120 may be measured by the measurement unit 160, and the measurement unit 160 may measure the height of the specimen 20 through the detected reflected light R.

The reflected light R reaching the monitoring unit 170 is detected by the camera 174 through the imaging lens 173 passing through the second phase retardation plate (¼ wavelength retardation plate) 171 and the linear polarizer 172. In respect to the reflected light reflected by the camera 174, both the collected light forming the focus with respect to the specimen 20 and the diverged light not forming the focus are detected, and through this, a location which specifies the height of the specimen 20 may be measured.

Accordingly, even when the location (measurement point) at which the height of the specimen 20 is measured through the measurement unit 160 is changed, the monitoring unit 170 may measure the location (measurement point) of measuring the height simultaneously thereto.

Figure 7:
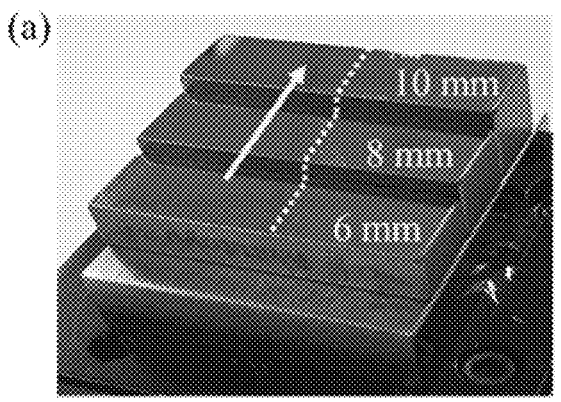
FIG. 7 illustrates an implement example of measuring a height of a specimen and a measurement point using the chromatic confocal sensor simultaneously according to an exemplary embodiment of the present invention.
Figure 7:
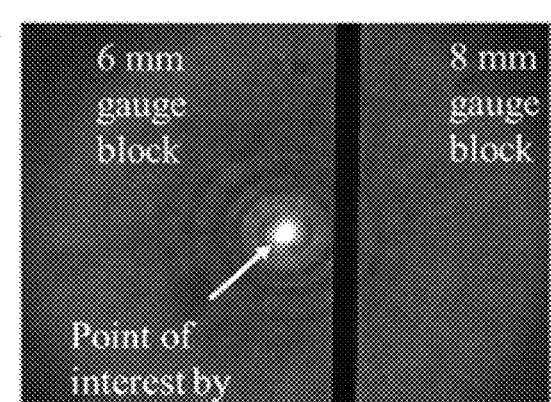
Figure 7:
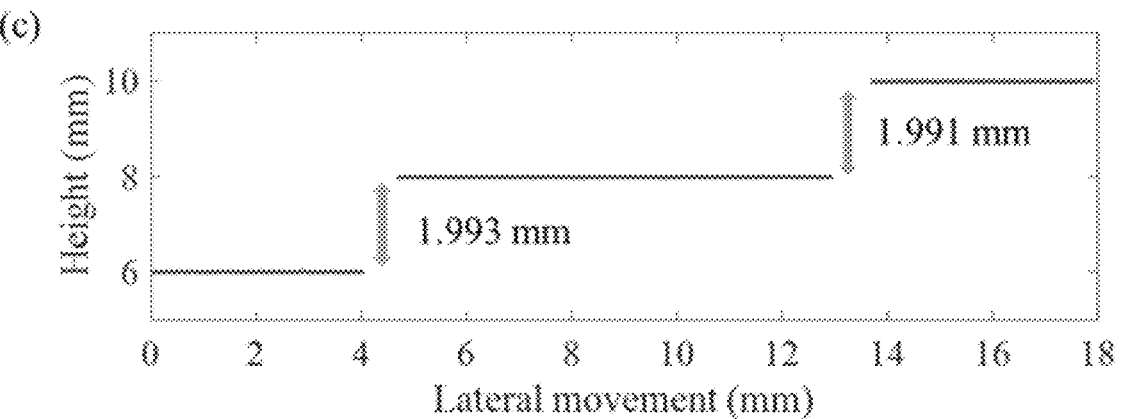

FIG. 7 illustrates an implement example of measuring a height of a specimen and a measurement point using the chromatic confocal sensor simultaneously according to an exemplary embodiment of the present invention, and in FIG. 7A, when specimens having heights of 6 mm, 8 mm, and 10 mm, respectively are prepared, the location of the measurement point may be confirmed in FIG. 7B, and in FIG. 7C, it may be confirmed that the height of the specimen is measured differently according to movement ("lateral movement") of the measurement point.

Figure 8:
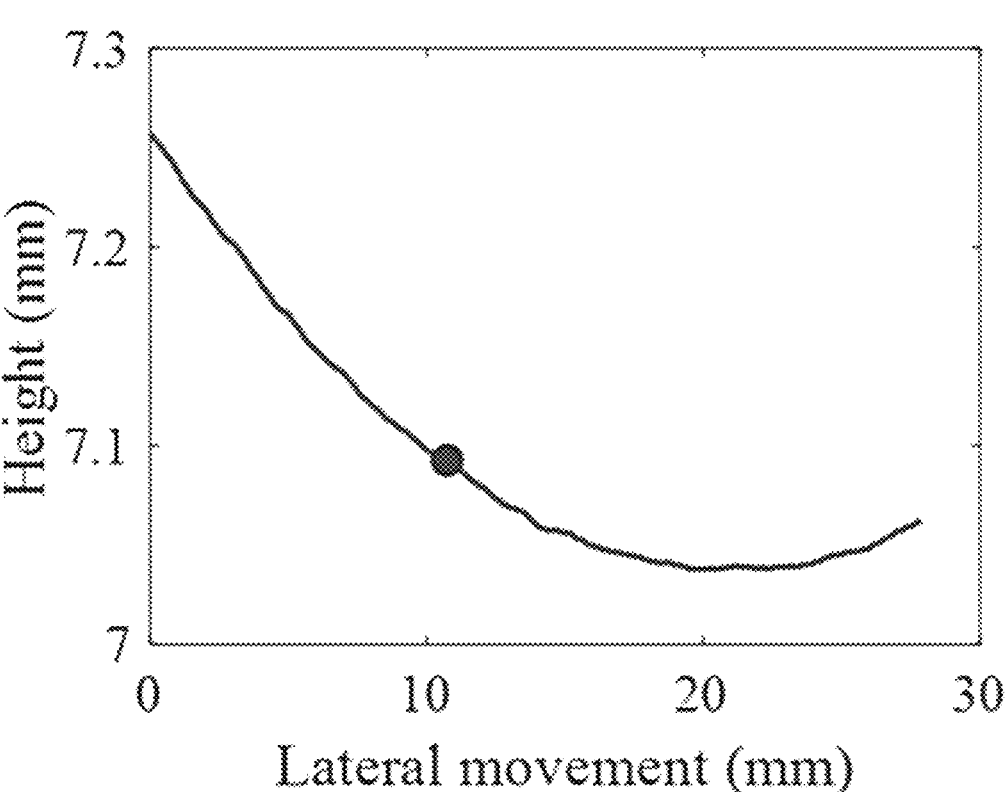
FIG. 8 illustrates another implement example of measuring the height of the specimen according to an exemplary embodiment of the present invention.

FIG. 8 illustrates another implement example of measuring the height of the specimen according to an exemplary embodiment of the present invention, and referring to FIG. 8, it may be confirmed that the height is measured differently according to the movement of the measurement point.

The above description just illustrates the technical spirit of the present invention and various changes and modifications can be made by those skilled in the art to which the present invention pertains without departing from an essential characteristic of the present invention.

The various embodiments disclosed herein may be performed in any order, simultaneously or separately.

In an exemplary embodiment, at least one step may be omitted or added in each figure described in this specification, may be performed in reverse order, or may be performed simultaneously.

The exemplary embodiments of the present invention are provided for illustrative purposes only but not intended to limit the technical spirit of the present invention. The scope of the present invention is not limited to the exemplary embodiments.

The protection scope of the present invention should be construed based on the following appended claims and it should be appreciated that the technical spirit included within the scope equivalent to the claims belongs to the scope of the present invention.

What is claimed is:

1. An apparatus of a vision chromatic confocal sensor, comprising:
   a light source unit generating incident light;
   an optical circulator receiving the incident light from the light source unit;
   a light conversion unit including a geometrical phase lens, and modulating the incident light received from the optical circulator and emitting incident light in which chromatic aberration is expressed to a specimen, and receiving reflected light reflected from the specimen;
   a stage at which the specimen to which the incident light emitted from the light conversion unit is irradiated is located;
   a beam splitter splitting the reflected light reflected by the specimen;
   a measurement unit detects the reflected light transmitted through the beam splitter and received by the light conversion unit; and
   a monitoring unit detecting the reflected light reflected by the beam splitter,
   wherein the measurement unit includes
   a collimating lens modulating the incident light received from the optical circulator into parallel light,
   a geometrical phase lens disposed at a rear stage from the collimating lens along a progress path of the incident light, and
   a first phase retardation plate disposed behind the geometrical phase lens along the progress path of the incident light.

2. The apparatus of a vision chromatic confocal sensor of claim 1, wherein the incident light generated by the light source unit is a white light source.

3. The apparatus of a vision chromatic confocal sensor of claim 1, wherein the geometrical phase lens is a metalens.

4. The apparatus of a vision chromatic confocal sensor of claim 1, wherein the geometrical phase lens polarizes the incident light to separate incident light collected on a focus of the specimen and diverged incident light.

5. The apparatus of a vision chromatic confocal sensor of claim 1, wherein the first phase retardation plate is a ¼ wavelength retardation plate.

6. The apparatus of a vision chromatic confocal sensor of claim 1, wherein the measurement unit is linked to the optical circulator.

7. An apparatus of a vision chromatic confocal sensor, comprising:
   a light source unit generating incident light;
   an optical circulator receiving the incident light from the light source unit;
   a light conversion unit including a geometrical phase lens, and modulating the incident light received from the optical circulator and emitting incident light in which chromatic aberration is expressed to a specimen, and receiving reflected light reflected from the specimen;
   a stage at which the specimen to which the incident light emitted from the light conversion unit is irradiated is located;

a beam splitter splitting the reflected light reflected by the specimen;

a measurement unit detects the reflected light transmitted through the beam splitter and received by the light conversion unit; and a monitoring unit detecting the reflected light reflected by the beam splitter wherein the monitoring unit includes a second phase retardation plate accommodating the reflected light reflected by the beam splitter, a linear polarizer disposed behind the second phase retardation plate along a progress path of the reflected light, and an imaging lens disposed behind the linear polarizer along the progress path of the reflected light.

8. The apparatus of a vision chromatic confocal sensor of claim 7, wherein the monitoring unit further includes a camera detecting the reflected light transmitted through the imaging lens.

\* \* \* \* \*